3,090,819
TRANSMETALATION PROCESS
Walter E. Foster, Baton Rouge, La., assignor to Ethyl Corporation, New York, N.Y., a corporation of Virginia
No Drawing. Filed Feb. 24, 1959, Ser. No. 794,817
12 Claims. (Cl. 260—665)

This invention relates to a method of preparing organic compounds and more particularly to the preparation of aliphatic polyolefin hydrocarbons and organo alkali metal compounds.

Aliphatic polyolefin hydrocarbons are extremely interesting chemical compounds which are readily converted into valuable industrial materials by processes well known to those skilled in the art. Of particular interest are those long chain aliphatic polyolefin compounds wherein the unsaturation is located near the terminal carbons of the molecular chain. These compounds can easily be processed to form long chain (4 or more carbons) polycarboxylic acids, esters, polyglycols, polyaldehydes, polyketones, polyacetals, polyethers and other polyfunctional compounds which are of great industrial value. For example, octa-2,6-diene can be oxidized easily to form succinic acid. Or, if desired, the octadiene can be treated chemically to form the heretofore unavailable 2,3,6,7-octatetrol. Heretofore, there has been no known method for manufacturing many other similar compounds and the manufacture of numerous known compounds of this type has been limited to the use of difficult and expensive processes, thereby increasing their cost and limiting their commercial utilization.

The transmetalation of aryl compounds is a well known chemical process which can be employed to convert relatively inexpensive and available hydrocarbons into valuable derivatives, i.e., carboxylic acids and their esters, polycarboxylic acids and their esters, alcohols, etc. Typical examples are the formation of phenylacetic acid or phenylmalonic acid and their derivatives from toluene and the formation of phenylenediacetic acid from xylene. These conversion processes are not used presently because of the many disadvantages inherent in their operation. Thus, prior metalation reactions [Industrial and Engineering Chemistry 46 No. 3, page 539 (1954)] were conducted by first chlorinating an aromatic compound, such as benzene or toluene, to produce the corresponding chloroaromatic compound i.e. chlorobenzene or chlorotoluene. The chloroaromatic compound was then reacted with sodium or another alkali metal to form the aromatic alkali metal compound, i.e., phenylsodium. The so-formed aromatic alkali metal compound can then be reacted with substances containing reactive groups, such as carbon dioxide, sulfur dioxide, nitriles, alkyl halides, aromatic nitro compounds, acid anhydrides and compounds containing reactive hydrogen atoms which are able to be replaced by an alkali metal. For example, reacting phenylsodium with toluene and carbonating the product so-formed, results in the formation of the sodium salt of phenylacetic acid which can be hydrolyzed, if desired, to the free acid. Alternatively, aliphatic halides were reacted with sodium and the so-formed alkyl sodium compounds were heated with aromatic compounds to form the desired aromatic alkali metal compounds by transmetalation.

These prior metalation processes, however, give as a by-product equal molar quantities of (1) the hydrocarbon which was chlorinated in the first reaction of the process and (2) the desired metalated product. The process, therefore, requires preparation of the desired product from large quantities of the starting material and requires handling large quantities of materials, of which only about one half can be recovered as a valuable material.

In addition, these prior metalation processes are generally deemed unsuitable for commercialization due to the difficulties and high costs connected with their use. Further, the prior processes require many separate process steps as well as long periods for appreciable reaction which at best converts only half of the reactants, e.g., toluene and sodium, to the desired product and completely degrades the chlorine values to sodium chloride. The above objectionable features of the prior art materially increase the overall costs of the desired end product, and make its manufacture by these processes commercially unattractive.

It is accordingly an object of the present invention to provide a process for the manufacture of aliphatic polyolefin hydrocarbons. Another object is to provide a process of the above type which is suitable for manufacturing a very wide variety of aliphatic polyolefin hydrocarbons, including many which were heretofore unknown or not capable of preparation by prior methods. Still another object of this invention is to provide for the conjoint manufacture of an aliphatic polyolefin hydrocarbon and a metalated organic compound. Another object is to provide a process of the above character which can be conducted over a relatively broad temperature range. Another object is to provide a simpler, more economical process of the above type. Other objects and advantages of the invention will be apparent from the following description and appended claims.

It has now been found that a wide variety of valuable aliphatic polyolefin hydrocarbons and organo alkali metal compounds, which in some cases were previously unknown, can be simultaneously prepared by reacting an organic compound, particularly one having an active hydrogen, with an alkali metal aliphatic polyolefin compound. Both of these valuable co-products have particular utility as intermediates in the production of a very wide variety of commercial chemicals and some heretofore unavailable chemicals, particularly, certain mono and polycarboxylic acids, esters, alcohols, aldehydes, nitriles, etc.

More particularly, the process of this invention can be conducted by initially contacting an organic compound containing an active hydrogen, such as aryl, acetylenic, nitrile, aliphatic carboxylic acid salt or cyclodienyl compounds, with an alkali metal aliphatic polyolefin compound, e.g., disodio octadiene, at a temperature not greater than about 40° C. in the presence of an active solvent. If desired, the reaction can be completed at a temperature below about 40° C. However, in a preferred embodiment of this invention, following the initial low temperature contact period, substantially all of the active solvent is removed at a temperature below about 40° C. and the reaction is completed at an elevated temperature in the range between about 50° C. and 250° C.

As a variation in the process, the transmetalation reaction noted above can be conducted simultaneously with the formation of the alkali metal aliphatic polyolefin. In one such method, an active solvent and an alkali metal dispersion are added to a reactor equipped with a stirrer and reflux condenser. The alkali metal can be dispersed in an inert solvent, such as isooctane, or, if desired, in the organic compound to be transmetalated in the process. An aliphatic conjugated polyolefin is then added with agitation as a dilute feed stream (usually as a dilute gas stream) over a period of time to form initially the alkali metal aliphatic polyolefin, preferably the dimetalated derivative. The organic compound to be transmetalated can be added to the reaction either in whole or in part, before or during the addition of the conjugated polyolefin. In some cases, the organic compound can be employed as the dispersing medium for the alkali metal and/or as a diluent for the active solvent. The reaction then proceeds for a period of time with rapid stirring until complete. In the preferred embodiment of this invention, substantially all of the active solvent is removed at a temperature below 40° C. following the addition of at least a part of the organic compound to the reactor containing the alkali metal aliphatic polyolefin compound and the active solvent. The reaction temperature is then raised to between about 50° and 250° C. in order to complete the transmetalation reaction. The aliphatic polyolefin hydrocarbon and the organo alkali metal compound formed by this reaction can thereafter be separately recovered. If desired, these materials can be further reacted chemically to convert them into other valuable materials. Since the organo alkali metal compounds formed by this process tend to be unstable and difficult to handle when exposed to air, it is frequently desirable to subject them to further chemical reactions without prior separations. These subsequent chemical reactions can be conducted in the reaction mixture in which the organo alkali metal compounds were formed, thereby forming other valuable materials whose physical and chemical properties are such as to facilitate their separation from the reaction mixture. For example, the organo alkali metal compound can be reacted in typical Grignard type reactions with carbon dioxide to give carboxylic acids, with sulfur dioxide to give sulfinic acids, with formaldehyde, epoxides or oxygen to give alcohols, with cyanogen chloride to give nitriles or used generally as a Grignard type reagent in reactions with esters, acid anhydrides, aldehydes, ketones, halides and nitriles. The aliphatic polyolefin hydrocarbons formed in this reaction can be converted to aldehydes, alcohols, carboxylic acids and the like.

A wide variety of aliphatic polyolefin hydrocarbons can be produced by the present invention. Typical examples of such hydrocarbons are the octadienes, such as octa-1,6-diene, octa-1,7-diene and octa-2,6-diene; the substituted octadienes, such as 4,5 dimethylocta1,6-diene, 4,5 dimethylocta-2,6-diene, 2,7 dimethylocta-1,6-diene, 2,7 dimethylocta-2,6-diene, 2,7 dimethylocta-1,7-diene, 3,6 dimethylocta-1,6-diene, 3,6 dimethylocta-2,6-diene, 3,6 dimethylocta-3,6-diene, 2,6 dimethylocta-1,7-diene, 2,6 dimethylocta-2,6-diene, 3,7 dimethylocta-1,6-diene, 2,3,6,7-tetramethylocta - 1,6 - diene, 2,3,6,7 tetramethylocta-1,7-diene, 2,3,6,7 tetramethylocta-2,6-diene 2,3,6,7-tetra-t-butylocta-1,6-diene, 2,3,6,7 - tetra - t - butylocta-1,7-diene, 2,3,6,7-tetra-t-butylocta-2,6-diene, 1,8 diphenylocta-1,6-diene, 1,8 diphenylocta-2,6-diene, 1,8 diphenylocta-1,7-diene, 1,5 diphenylocta-2,6-diene, 1,5 diphenylocta-1,6-diene, 1,5 diphenylocta-1,7-diene, 4,5 diphenylocta-2,6-diene, 4,5 diphenylocta-1,6-diene, 4,5 diphenylocta-1,7-diene, 1,4,5,8 tetraphenylocta-1,6-diene, 1,4,5,8 tetraphenylocta-1,7-diene, 1,4,5,8 tetraphenylocta-2,6-diene, 2,3,6,7 tetraphenylocta-2,6-diene, 2,3,6,7 tetraphenylocta-1,6-diene, 2,3,6,7 tetraphenylocta-1,7-diene, and the like. Other typical examples of the type of aliphatic polyolefin hydrocarbons formed by the present invention are 4-methylnona-2,6-diene, 4-methylnona-1,6-diene, deca-2,7-diene, deca-2,8-diene, deca-3,7-diene, 5,6 dimethyldeca-2,8-diene, 5,6 dimethyldeca-2,7-diene, 5,6 dimethyldeca-3,7-diene, 3,4,5,6,7,8 hexamethyldeca-2,7-diene, 3,4,5,6,7,8 hexamethyldeca-2,8-diene, 3,4,5,6,7,8 hexamethyldeca-3,7-diene, dodeca-2,4,8,10-tetrene, dodeca-1,3,9,11-tetrene, dodeca-2,4,9,11-tetrene, 4 ethenedeca-1,6,8-triene, 4,5 dietheneocta-1,7-diene, 4 ethenedeca-1,5,7,9-tetrene and other polyolefins belonging to the group having a general formula of $C_nH_{2n-2}$ which heretofore have been either extremely difficult and costly to prepare or which are unknown at the present time.

The aliphatic polyolefin hydrocarbons prepared by the present invention can be converted to long chain polyfunctional compounds such as polycarboxylic acids, polyaldehydes, polyketones, polyacetals, polyethers, polyalcohols, polyhalides, polynitriles, polyamides, polyesters, polyurethans, polynitro compounds, polyepoxides, etc. For example, octa-1,6-diene can be reacted with an oxidizing agent, such as cold potassium permanganate to form 1,2,6,7 octanetetrol. Further, octa-1,6-diene can be reacted with a halogen to produce the corresponding polyhalide or contacted with carbon monoxide and hydrogen under certain process conditions to produce 2-methyl azelaic dialdehyde which can then be oxidized to 2-methyl azelaic acid. Similarly, other polyfunctional compounds can be prepared by subjecting the polyolefins to other well known reactions and further reacting the products so-formed. Typical examples of other such polyfunctional compounds formed from the polyolefin products of the present invention are 2,3,6,7-octanetetrol, 1,2,7,8-octanetetrol, 2,7-octanediol, adipic acid, 2-methylglutaric acid, 1,2-dimethyl glutaric acid, 2,5-dimethyl adipic acid, 2,3,6,7-tetramethyl suberic acid, 3,4-dimethyl pimelic acid, 4,5-dimethyl suberic acid, 2,3,4,5-tetramethyl adipic acid, 3-phenyl pimelic acid, 3,4-diphenyl adipic acid, 4,5-diphenyl suberic acid and other similar alcohols, aldehydes and acids.

Some typical examples of halogenated materials which can be prepared from the aliphatic polyolefins obtained in this invention are 2,3,6,7 tetrachlorooctane, 1,2,6,7 tetrachlorooctane, 3,4,7,8 tetrachlorodecane, 2,3,6,7 tetrachloro-4,5 dimethyloctane, 2,3,6,7 tetrachloro-2,3,6,7 tetramethyloctane, 2,3,6,7 tetrachloro-1,4,5,8 tetraphenyloctane, the corresponding bromo and iodo compounds and the like.

As described above, the present invention also produces organo alkali metal compounds as valuable co-products of the above-mentioned aliphatic polyolefin hydrocarbons. In general, alkali metal substitution compounds of an organic compound having an active hydrogen, particularly aryl, acetylenic, nitrile aliphatic carboxylic acid salt and cyclodienyl compounds or the mono or polysubstituted derivatives of aryl compounds, can be prepared by the process of this invention. These aryl derivatives, however, should not contain any functional groups such as the hydroxy, carboxyl, nitro, halide (other than fluoride) and the like groups which are reactive towards alkali metals. Aryl compounds which are suitable for forming alkali metal substitution compounds include benzene, diphenyl methane, triphenylmethane, phenylacetylene, acenaphthene, retene, indene, aryl ethers as, for example, anisole, aryl carboxylic acid salts, aryl sulfonic acid salts, aryl fluorides, furan, fluorene, thiophene, pyrrole, pyrazole, imidazole, triazoles, tetrazoles, oxazole, thionaphthene, indole, coumarin, quinoline, cinnoline, naphthyridine, carbazole, thioanthrene, acridine, phenazine and the mono and poly-alkyl derivatives of these aryl compounds.

Other organic compounds which can be metalated in this improved process are acetylene and homologues of acetylene, acetonitrile and its homologues, cyclopentadiene, 2-methylcyclopentadiene, 3-methylcyclopentadiene, 2,3-dimethylcyclopentadiene, 1-methylcyclopentadiene, 3-ethylcyclopentadiene, 3-propylcyclopentadiene and the like.

The aliphatic carboxylic acid salts, suitable for use in the process of this invention, are preferably alkali metal salts and contain from 2 to 20 carbon atoms. Best results are obtained with monocarboxylic acid salts. Typical examples of alkali metal aliphatic salts are sodium acetate, sodium propionate, sodium butyrate, sodium hexanoate, the corresponding lithium and potassium salts and other alkali metal salts containing up to 20 carbon atoms.

Typical examples of transmetalated alkali metal compounds which can be prepared by the process of this invention are phenyl sodium, phenyl lithium, benzylsodium, benzyl potassium, diphenylmethyl sodium, o-anisylsodium, p-methylbenzylsodium, xylylene disodium, pyrrylsodium, α-naphthobenzyl sodium, sodium acetylide, potassium acetylide, α-sodio acetonitrile, cyclopentadienyl sodium, α-sodio sodium acetate, α-potassium potassium acetate, α-sodio sodium propionate, α-sodio sodium caproate, α-sodio sodium palmitate, α-lithio lithium stearate, etc.

These alkali metal compounds can thereafter be further reacted to form other valuable materials, as for example, phenylacetic acid, p-phenylene diacetic acid, terephthalic acid, trimesic acid, and other aryl carboxylic acids. Further, these alkali metal compounds can be reacted with formaldehyde to form primary alcohols, with other aldehydes to form secondary alcohols, with ketones and esters to form tertiary alcohols, with nitriles to form ketones and with halogenated compounds to undergo a condensation reaction.

The alkali metal aliphatic polyolefin compounds employed in the practice of the present invention can be prepared by a variety of processes. As pointed out above, in one method of preparing these alkali metal aliphatic polyolefin compounds, a dilute stream of a conjugated aliphatic polyene is permitted to react with finely dispersed alkali metal in the presence of an active solvent. The alkali metal dispersion is generally prepared by rapidly stirring and then cooling a mixture of the molten metal and an inert solvent containing from 1 to 50 percent, and preferably from 5 to 35 percent by weight of the metal, based on the total weight of the dispersion, thereby solidifying the metal to form particles having a size generally less than about 50 microns, and preferably less than about 10 microns. Dispersing aids known to the art, e.g., oleic acid, dilinoleic acid, frequently can be used. The so-formed alkali metal dispersion, consisting principally of the metal dispersed within an inert solvent, is then mixed with the active solvent to be used in the polyolefin addition reaction. In some cases the reaction can be conducted in the presence of a polynuclear aromatic hydrocarbon, such as naphthalene or terphenyl, as a catalyst. The reaction temperature is maintained below 40° C. and usually below 0° C. The reaction proceeds smoothly as the conjugated aliphatic polyolefin is added slowly and the alkali metal aliphatic polyolefin compound usually separates as a solid phase. Still another method for preparing these alkali metal compounds is by reacting the conjugated aliphatic polyolefin with dispersed alkali metal in the presence of a mixture of an active solvent and the compound containing an active hydrogen with which the alkali metal aliphatic polyolefin compound is to be reacted. By this method, the transmetalation reaction of the present invention can be carried out concurrently with the formation of the alkali metal aliphatic polyolefin compound. In both methods, effective agitation of the reaction mixture is desirable.

While it is usually preferred to employ sodium or potassium as the alkali metal component of the organometallic compound used in the present invention, all of the other alkali metals are suitable. Thus, lithium, rubidium, cesium and francium can be employed in the preparation of the alkali metal aliphatic polyolefin compounds with equally good results. Mixtures or alloys of alkali and alkaline earth metals also may be used. The use of sodium is preferred, however, primarily because of cost and availability.

Although the present invention can be carried out over a wide range of temperature, the initial reaction temperature employed is of importance. Generally, satisfactory results are obtained when temperatures up to about 40° C. are maintained during the initial stages of the reaction although it has been found that reaction temperatures below about 0° C. are preferred and give the best results. Satisfactory results have also been obtained when operating at temperatures as low as −80° C. In the preferred embodiments of this invention where it is desired to operate at higher temperatures after the initial reaction period, the active solvent is removed at a temperature below about 40° C. and preferably below about 0° C. and the residual reaction mixture is then heated to a temperature above about 50° C. in order to complete the reaction. In general, higher temperatures are employed with the higher boiling organic compounds and temperatures between about 50° and 250° C. can be satisfactorily employed, although temperatures between about 80° and 150° C. are preferred.

The reaction time required to complete the transmetalation reaction, while not too critical, is an important factor in the present invention. Satisfactory yields of the aliphatic polyolefin products are obtained only when the transmetalation reaction is allowed sufficient time to proceed to completion. From the chemistry of the transmetalation reaction, a transfer of two atoms of the alkali metal per molecule of aliphatic polyolefin hydrocarbon formed is involved. It appears that an incomplete transmetalation reaction normally results in the formation of a monoalkali metal aliphatic polyolefin compound and a decreased yield of the desired polyolefin hydrocarbon. This situation is particularly disadvantageous when the combined reaction product is to be further reacted, e.g., by a carbonation reaction. In such cases, not only does the transmetalated compound react with the carbon dioxide but any co-present monoalkali metal aliphatic polyolefin undergoes the same reaction to form a product consisting of the alkali metal salt of a complicated mixture of carboxylic acids.

When practicing the preferred embodiment of the invention wherein the reaction is completed at a temperature above 50° C., it is desirable to contact the alkali metal aliphatic polyolefin with the other reactants for a reaction period of not less than about one half hour at a temperature below about 40° C. followed by a reaction period of not less than about one hour at a temperature above 50° C. In the event that it is desired to practice the low temperature embodiment of this invention, wherein the transmetalation reaction occurs concurrently with the formation of the alkali metal polyolefin compound, it is generally desirable and frequently necessary to allow the reaction to continue for at least an additional one half hour following the complete formation of the alkali metal polyolefin compound, particularly if this reaction period is less than about 7 hours. This additional reaction period is particularly desirable if the combined reaction products are to be subjected to a subsequent reaction, e.g., carbonation, sulfonation, etc.

Pressure is not too critical in the practice of this invention. Pressures above atmospheric can be used if desired or when necessary to confine the solvents when temperatures above their atmospheric boiling point are employed. Subatmospheric pressures can also be used, particularly when it is desired to remove the active solvent prior to completing the reaction at an elevated temperature. Generally, however, it is preferred to operate at atmospheric pressure primarily as a matter of convenience and ease of operation.

The active solvents suitable for use in the present invention can be selected from the group consisting of ethers, acetals and tertiary amines.

A preferred group of ethers for use in the present invention include both aliphatic mono- and polyethers. The preferred monoethers have a $CH_3$—O— group and have an oxygen:carbon ratio not less than 1:4. Typical examples of these preferred monoethers are dimethyl ether, methyl ethyl ether, methyl isopropyl ether, methyl n-propyl ether or mixtures of these ethers. The above ethers can also be mixed with hydrocarbon solvents, if desired.

The preferred polyethers are ethylene glycol diethers, such as methyl methyl, methyl ethyl, ethyl ethyl, methyl butyl, ethyl butyl, butyl butyl, butyl lauryl; diethylene glycol ethers, such as methyl methyl, methyl ethyl, ethyl butyl and butyl lauryl; trimethylene glycol ethers, such as dimethyl, diethyl, methyl ethyl, etc.; glycerol ethers, such as trimethyl, dimethyl ethyl, diethyl methyl, etc.; and cyclic ethers, such as dioxane, tetrahydrofuran, methyl glycerol formal, dimethylene pentaerythrite.

A wide variety of acetals can also be used in the present invention. Typical examples of suitable acetals are methylal, 1,1-dimethoxy ethane, 1,1-dimethoxy propane, 1,1-dimethoxy butane, methylal glycol formal, methyl glycerol formal, etc. The preferred acetals are methylal, methylal glycol formal and methyl glycerol formal.

A wide variety of tertiary amines are suitable for this invention including both aliphatic and aromatic amines. The preferred tertiary amines for use in this invention are trimethyl amine, dimethyl ethyl amine, tetramethyl methylene diamine and N-methyl morpholine.

The amount of active solvent employed in the reaction mixture can be varied considerably without departing from the scope of the invention. The amounts used will generally depend on the particular reactants and solvent used. In general, the use of from 100 to 2,000 cc. of solvent per gram mole of alkali metal aliphatic polyolefin compound being reacted is recommended as a suitable reaction dilution. When a diluent is used along with the active solvent, sufficient active solvent should be present to have an active promoting effect upon the reaction. In the specific embodiment of the invention wherein the transmetalation reaction occurs concurrently with the formation of the alkali metal polyolefin, it is preferred to use a reaction medium which contains a weight of active solvent at least as great as the weight of any co-present diluent.

For those reactions in which it is desired to heat the reaction mixture during the final stages of the transmetalation, it is generally preferred to use a more volatile active solvent so that it can be removed more conveniently.

The proportion of alkali metal aliphatic polyolefin compound to the organic compound having an active hydrogen varies over a wide range depending on the compounds employed and the degree of metalation desired. In order to obtain a satisfactory conversion of the alkali metal aliphatic polyolefin component to the corresponding aliphatic polyolefin hydrocarbon, it is generally desirable to use at least the required theoretical amount of the organic compound to be transmetalated. Generally, when monometalation of the compound to be transmetalated is desired, at least a stoichiometric amount of this compound is employed, and frequently it can be present in excess of this amount. Thus, as mentioned above, it often can be used conveniently as a reaction medium diluent or as the principal solvent in the latter stages of the preferred embodiment of the transmetalation reaction wherein the active solvent is removed prior to bringing the reaction to completion at an elevated temperature. Where it is desired to polymetalate an organic compound, it is preferred to employ substantially about stoichiometric quantities of each of the reactants, i.e., the alkali metal aliphatic polyolefin and the organic compound to be transmetalated.

The following non-limiting examples illustrate the process of the present invention. All proportions are given by weight.

EXAMPLE I

A stirred reaction vessel was equipped with a condenser having a gas inlet tube reaching below the surface of the reaction mixture. About 250 parts of dimethyl ether and 17.2 parts of sodium dispersed in 60 parts of toluene were then added. Twenty-seven (27) parts of butadiene were gradually added in a dilute gas stream over a period of 5 hours while maintaining the reaction mixture at a temperature of −30° C. The reaction mixture was stirred for an additional hour at −30° C., to complete the conversion of toluene to benzyl sodium and the formation of an isomeric mixture of octadienes. Thereafter, 290 parts of isooctane were added and the mixture was poured on to an excess of crushed Dry Ice to convert the benzyl sodium to sodium phenyl actate. The excess Dry Ice was evaporated and the reaction mixture was quenched with 100 parts of distilled water in a nitrogen atmosphere. The aqueous product solution was separated from the isooctane solution and acidified with concentrated hydrochloric acid to give a white flocculent product containing the desired phenyl acetic acid. This product was distilled under reduced pressure to give 48.3 parts of the phenylacetic acid, having a melting point of 63° to 70° C. and a neutralization equivalent of 138. This corresponds to a yield of 71 percent, based on the butadiene reacted. This material was recrystallized to produce a product having a melting point of 76–77° C. The isooctane fraction, above, yielded 16.8 parts of an isomeric mixture of octadienes with the octa-1,6-diene isomer being present as the predominant isomer.

EXAMPLE II

This example illustrates the preferred embodiment of the process of this invention wherein the reaction is initiated at a low temperature and completed at an elevated temperature.

To the reactor of Example I were added 320 parts of dimethyl ether and 25 parts of sodium having an average particle size of about 10 microns and dispersed in an equal amount of toluene. Twenty-five parts of butadiene were added in a dilute gas stream over a period of 5 hours, during which time the reaction temperature was maintained at −30° C. The reaction mixture was stirred for an additional ¾ hour at −30° C. and 260 parts of dry toluene were added. The reaction mixture was warmed over a period of one half hour to remove most of the dimethyl ether solvent at a temperature below 20° C. and the last traces of the solvent were removed by heating the mixture to 100° C. The mixture was then heated for 2 hours at 100° to 105° C. with rapid stirring to prevent charring and then cooled to 0° C. The cooled mxture containing benzyl sodium and an isomeric mixture of octadienes was poured on to an excess of crushed Dry Ice to convert the benzyl sodium to sodium phenyl acetate. The excess Dry Ice was evaporated and the reaction mixture was quenched with 100 parts of distilled water in a nitrogen atmosphere. The product was separated into an aqueous and organic phase. The aqueous phase was acidified with concentrated hydrochloric acid to give 50.7 parts of phenylacetic acid, having a melting point of 63° to 70° C. and a neutralization equivalent of 138. This corresponds to a yield of 80.5 percent based on the butadiene. The organic phase yielded an isomeric mixture of octa-1,6-diene, octa-1,7-diene and octa-2,6-diene with the octa-1,6-diene isomer largely predominating.

EXAMPLE III

When any of the following active solvents are employed in the processes of Examples I and II, similarly good results are obtained:

Methyl ethyl ether
Methyl isopropyl ether
Ethylene glycol dimethyl ether
1,1-dimethoxy ethane
Tetrahydrofuran
Dioxane
Methyl glycol formal
Trimethyl amine
Methyl diethyl amine
Tetramethyl methylene diamine

EXAMPLE IV

Example I is repeated except that p-xylene is metalated instead of toluene. In this example, 26 parts of p-xylene are employed instead of the 60 parts of toluene. Similar yields are obtained except that p-phenylene diacetic acid is obtained as a product instead of the phenyl acetic acid of Example I.

EXAMPLE V

The following runs are typical examples of the wide variety of aryl compounds which can be metalated by the present invention. The apparatus and method of Examples I and II are used except that the aryl component is varied. Similar results to those of Examples I and II are obtained in each case.

Table I

| Aryl compound: | Aryl acid obtained |
| --- | --- |
| Benzene | Benzoic acid. |
| Mesitylene | Trimesic acid. |
| Anisole | Anisic acid. |
| Indene | 1-carboxy-indene. |

EXAMPLE VI

Example I is repeated except that 2,3-dimethylbutadiene is employed in place of the butadiene and in the same molar proportions. A similar yield of the phenylacetic acid and the isomeric mixture of tetramethyloctadienes is also obtained.

EXAMPLE VII

Example II is repeated except that cumene is used instead of toluene. In this example a total quantity of 325 parts of cumene are added to the reactor. Moreover, following the removal of the active solvent, the reaction mixture is heated for two hours at 140° C. instead of the 100° to 105° C. used in Example II. A satisfactory yield of p-isopropylbenzoic acid and an isomeric mixture of octadienes are obtained.

EXAMPLE VIII

Example II is repeated except that after completing the reaction the cooled reaction mixture is contacted with a stream of dry sulfur dioxide until the acid reaction to Congo paper disappears and the mass is further worked up as described in Example II. α-Toluenesulfinic acid and an isomeric mixture of octadienes are obtained in satisfactory yields.

EXAMPLE IX

Example II is repeated except that upon completing the reaction, the reaction mixture is treated with excess benzonitrile. When the reaction is complete, the whole mass is stirred for an hour at room temperature, then poured into water and the organic phase is separated, boiled with dilute hydrochloric acid, cooled and extracted with ether. On distilling the ether extract, desoxybenzoin and an isomeric mixture of octadienes are obtained.

EXAMPLE X

Example II is repeated except that upon completing the reaction, the reaction mixture is treated with an excess of formaldehyde. The mixture is cooled, hydrolyzed with dilute hydrochloric acid and the resulting mixture is extracted with ether. On distillation of the ethereal extract, phenethyl alcohol and an isomeric mixture of octadienes are obtained.

EXAMPLE XI

Example I is repeated except that methylacetylene is metalated instead of toluene. In this example, 60 parts of isooctane are present in the reactor as the dispersion medium for the sodium and 22 parts of methylacetylene are employed instead the 60 parts of toluene. An equally satisfactory yield of tetrolic acid is obtained as well as a comparable yield of the isomeric mixture of octadienes.

EXAMPLE XII

Example XI is repeated except that acetonitrile is metalated instead of methylacetylene. In this example, 21 parts of acetonitrile are employed and the yield of products obtained are similar to those obtained in the other examples. Cyanoacetic acid and an isomeric mixture of octadienes are recovered as products.

EXAMPLE XIII

Example XI is repeated except that cyclopentadiene is employed as the material to be metalated. In this example, 34 parts of cyclopentadiene are used. The yield of products obtained is similar to Example XI. 5-carboxy-1,3 cyclopentadiene and an isomeric mixture of octadienes are obtained as products.

When sodium is replaced with other alkali metals or mixtures containing a major proportion of an alkali metal such as lithium, potassium, cesium, rubidium, francium, alloys of sodium and potassium or sodium and calcium, substantially identical results are obtained as in the examples given above.

Equally good results are obtained when 1-methylbutadiene, 2-methylbutadiene, 1,2-dimethylbutadiene, 1,3-dimethylbutadiene, 1,4 - dimethylbutadiene, 1,1,4,4 - tetramethylbutadiene, 2,3-di-t-butylbutadiene, 1-phenylbutadiene, 1,2-diphenylbutadiene, 1,3-diphenylbutadiene, 1,4-diphenylbutadiene, 1,3,5-hexatriene and 1,3,5-heptatriene are employed in the above reactions as the conjugated polyene reactant.

Similarly, when o-xylene, m-xylene, 1,2,3-trimethylbenzene, 1,2,4-trimethylbenzene, α-methylnaphthalene, β-methylnaphthalene, diphenylmethane, acenaphthene, phenylacetylene, pyrrole, indole, quinoline, fluorene, retene, propionitrile, acetylene and 2-methyl cyclopentadiene are employed as the reactant to be transmetalated, the corresponding metalated compound or its reaction product is readily recovered in good yields.

Similarly good results are obtained over a wide range of reaction temperatures. Reaction temperatures as low as —80° C. and as high as 40° C. give good yeilds of aliphatic polyolefin hydrocarbons and transmetalated compounds when employing the low temperature process of this invention. In the preferred embodiment of the process of the invention, wherein the solvent is removed at a temperature below about 40° C. prior to completing the reaction at an elevated temperature, uniformly good results are obtained when subsequent reaction temperatures as low as 50° C. and as high as 250° C. are employed to complete the reaction.

EXAMPLE XIV

Example I was repeated except that sodium metal, butadiene and sodium acetate were reacted in ethylene glycol dimethyl ether at 50° C. The sodium acetate was employed in equal molar proportions with the sodium metal. The α-sodio sodium acetate was produced in 92 percent conversion. Similar results are obtained with lithium and potassium metal and with the corresponding alkali metal salts of propionic, butyric and other acids containing up to 20 carbon atoms.

As is believed apparent from the above, the present invention provides a means of economically producing a wide variety of aliphatic polyolefin hydrocarbons and metalated compounds, many of which have heretofore been unavailable. More particularly, these aliphatic polyolefin hydrocarbons and metalated compounds can be produced conjointly and over a relatively broad reaction temperature range. From the above, it is apparent that by varying the conjugated polyene or the compound to be transmetalated in the process, a wide spectrum of aliphatic polyolefin hydrocarbons and metalated compounds can be produced as desired. The products can be used as important chemical intermediates in the manufacture of valuable polymeric materials, plasticizers, synthetic detergents, anti-foaming agents, solvents, adhesives, and many other valuable materials.

This application is continuation-in-part of application Serial No. 448,773 filed August 9, 1954, now abandoned.

I claim:

1. A transmetalation process for preparing aliphatic polyolefin hydrocarbons containing at least 8 carbon atoms and organo alkali metal compounds simultaneously, which comprises reacting (a) a dialkali metal polyolefin compound containing at least 8 carbon atoms with (b) an active hydrogen-containing organic reagent capable of forming an alkali metal derivative thereof, selected from the group consisting of (1) aryl hydrocarbons, (2) acetylenic hydrocarbons, (3) cyclodienyl hydrocarbons, (4) aryl ethers, (5) aryl fluorides, (6) alkali metal salts of monocarboxylic acids containing between about 2 through 20 carbon atoms, and (7) substituted hydrocarbons, wherein the sole substituent is a nitrilo group; which reagents are free from functional groups which are reactive toward alkali metals, said dialkali metal polyolefin hydrocarbon being an octa to dodeca polyene and having an unsaturation ranging from dienes to tetraenes, said reaction being initiated at a temperature not greater than about 40° C. in a reaction medium consisting essentially of a solvent selected from the group consisting of ethers, acetals and tertiary amines; and recovering said polyolefin hydrocarbon and an alkali metal compound of said organic reagent as products of the reaction.

2. A transmetalation process for preparing aliphatic polyolefin hydrocarbons containing at least 8 carbon atoms and organo alkali metal compounds simultaneously, which comprises reacting (a) a dialkali metal polyolefin compound with (b) an active hydrogen-containing organic reagent capable of forming an alkali metal derivative thereof, selected from the group consisting of (1) aryl hydrocarbons, (2) acetylenic hydrocarbons, (3) cyclodienyl hydrocarbons, (4) aryl ethers, (5) aryl fluorides, (6) alkali metal salts of monocarboxylic acids containing between about 2 through 20 carbon atoms, and (7) substituted hydrocarbons wherein the sole substituent is a nitrilo group; which reagents are free from functional groups which are reactive toward alkali metals, said dialkali metal polyolefin being an octa to dodeca polyene and having an unsaturation ranging from dienes to tetraenes, said reaction being initially carried out at a temperature not greater than about 40° C. in a reaction medium consisting essentially of a solvent selected from the group consisting of ethers, acetals and tertiary amines, removing substantially all of said solvent at a temperature below about 40° C. and thereafter increasing the reaction temperature to between about 50° C. and 250° C. to complete the said transmetalation reaction.

3. A transmetalation process for preparing aliphatic polyolefin hydrocarbons containing at least 8 carbon atoms and organo alkali metal compounds simultaneously, which comprises reacting (a) a dialkali metal polyolefin compound with (b) an active hydrogen-containing organic reagent capable of forming an alkali metal derivative thereof, selected from the group consisting of (1) aryl hydrocarbons, (2) acetylenic hydrocarbons, (3) cyclodienyl hydrocarbons, (4) aryl ethers, (5) aryl fluorides, (6) alkali metal salts of monocarboxylic acids containing between about 2 through 20 carbon atoms, and (7) substituted hydrocarbons wherein the sole substituent is a nitrilo group, said reaction being initiated at a temperature not greater than about 40° C. in a reaction medium consisting essentially of a solvent selected from the group consisting of ethers, acetals and tertiary amines; and recovering said polyolefin hydrocarbon and alkali metal compound of said organic reagent as products of the reaction.

4. The process of claim 3 further defined wherein the dialkali metal polyolefin is disodiumoctadiene.

5. A transmetalation process for the simultaneous preparation of an aliphatic polyolefin hydrocarbon containing at least 8 carbon atoms and an organo alkali metal compound which comprises reacting (a) a dialkali metal polyolefin compound containing at least 8 carbon atoms with (b) an active hydrogen-containing organic reagent capable of forming an alkali metal derivative thereof, selected from the group consisting of (1) aryl hydrocarbons, (2) acetylenic hydrocarbons, (3) cyclodienyl hydrocarbons, (4) aryl ethers, (5) aryl fluorides, (6) alkali metal salts of monocarboxylic acids containing between about 2 through 20 carbon atoms, and (7) substituted hydrocarbons wherein the sole substituent is a nitrilo group; which reagent is free from functional groups which are reactive toward alkali metals, said dialkali metal polyolefin being an octa to dodeca polyene having an unsaturation ranging from dienes to tetraenes, said reaction being initiated at a temperature not greater than about 40° C. in a reaction medium comprising an ether selected from the groups consisting of aliphatic mono ethers having a methoxy group and an oxygen to carbon ratio of not less than 1:4, and polyethers derived from aliphatic polyhydric alcohols having all of the hydroxyl atoms replaced by alkyl groups and mixtures thereof.

6. A transmetalation process for the simultaneous preparation of an aliphatic polyolefin hydrocarbon containing at least 8 carbon atoms and an organo alkali metal compound which comprises reacting (a) a dialkali metal polyolefin with (b) an active hydrogen-containing reagent capable of forming an alkali metal derivative thereof, selected from the group consisting of (1) aryl hydrocarbons, (2) acetylenic hydrocarbons, (3) cyclodienyl hydrocarbons, (4) aryl ethers, (5) aryl fluorides, (6) alkali metal salts of monocarboxylic acids, containing between about 2 through 20 carbon atoms, and (7) substituted hydrocarbons wherein the sole substituent is a nitrilo group, said reaction being initiated at a temperature not greater than about 40° C. and in dimethyl ether.

7. A transmetalation process for the simultaneous preparation of an aliphatic polyolefin hydrocarbon containing at least 8 carbon atoms and an organo alkali metal compound which comprises reacting (a) a dialkali metal polyolefin hydrocarbon compound with (b) an active hydrogen-containing reagent capable of forming an alkali metal derivative thereof, selected from the group consisting of (1) aryl hydrocarbons, (2) acetylenic hydrocarbons, (3) cyclodienyl hydrocarbons, (4) aryl ethers, (5) aryl fluorides, (6) alkali metal salts of monocarboxylic acids containing between about 2 through 20 carbon atoms, and (7) substituted hydrocarbons wherein the sole substituent is a nitrilo group, said reaction being initiated at a temperature not greater than about 0° C. and in a reaction medium comprising an ether selected from the groups consisting of aliphatic mono ethers having a methoxy group and an oxygen to carbon ratio of not less than 1:4 and polyethers derived from aliphatic polyhydric alcohols having all of the hydroxyl hydrogen atoms replaced by alkyl groups and mixtures thereof.

8. A process for the simultaneous preparation of octadiene and benzyl sodium which comprises reacting disodium octadiene with toluene in a dimethyl ether reaction medium, said reaction being initiated at a temperature not greater than about 40° C. and thereafter recovering octadiene and benzyl sodium as products of the reaction.

9. An improved process for the preparation of benzyl sodium comprising reacting disodium octadiene with at least a stoichiometric quantity of toluene in a reaction medium consisting essentially of a solvent selected from the group consisting of ethers, acetals and tertiary amines, said reaction being initiated at a temperature not greater than about 40° C., completing said reaction to form benzyl sodium.

10. The process of claim 9 wherein the solvent is dimethyl ether.

11. A process for the simultaneous preparation of octadiene and alpha-sodio-sodium acetate which comprises reacting in approximately equimolar proportions disodium octadiene with sodium acetate in an ethylene glycol dimethyl ether reaction medium at a temperature of about 50° C., and thereafter recovering octadiene and alpha-sodio-sodium acetate as products of the reaction.

12. A transmetalation process for simultaneously preparing octadiene and an alpha-sodio-alkali metal salt of an aliphatic monocarboxylic acid which comprises reacting disodium octadiene with an alkali metal salt of an aliphatic monocarboxylic acid in an active solvent selected from the group consisting of ethers, acetals and tertiary amines, and thereupon recovering the octadiene and the alpha-sodio-alkali metal salt of an aliphatic monocarboxylic acid as products of the reaction; said reaction being initiated at a temperature not greater than about 40° C., said alkali metal salt of an aliphatic monocarboxylic acid containing from 2 to about 20 carbon atoms in the molecule and said disodium octadiene being formed by reacting butadiene with sodium in an active solvent as hereinabove defined.

References Cited in the file of this patent

UNITED STATES PATENTS

| | | |
|---|---|---|
| 1,934,123 | Hoffman et al. | Dec. 7, 1933 |
| 2,023,793 | Scott | Dec. 10, 1935 |
| 2,171,867 | Scott et al. | Sept. 5, 1939 |
| 2,171,871 | Walker | Sept. 5, 1939 |
| 2,773,092 | Carley et al. | Dec. 4, 1956 |
| 2,816,917 | Hansley et al. | Dec. 17, 1957 |
| 2,881,209 | Nobis et al. | Apr. 7, 1959 |

OTHER REFERENCES

Morton et al.: "Jour. Am. Chem. Soc.," vol. 69, pp. 160 (1947).

Coates: "Quart. Reviews" (London), vol. 4, pp. 217–235 (1950), p. 220 only needed.

Hansley: "Ind. & Eng. Chem.," vol. 43, No. 8, August 1951, pp. 1759 to 1766.